(12) United States Patent
Gaiser et al.

(10) Patent No.: US 10,348,072 B2
(45) Date of Patent: Jul. 9, 2019

(54) FLOOR CABLE CHANNEL

(71) Applicant: Race Result AG, Pfinztal (DE)

(72) Inventors: Konstantin Gaiser, Karlsruhe (DE); Nikias Klohr, Stutensee (DE)

(73) Assignee: Race Result AG, Pfinztal (DE)

( * ) Notice: Subject to any disclaimer, the term of this patent is extended or adjusted under 35 U.S.C. 154(b) by 0 days.

(21) Appl. No.: 15/575,295

(22) PCT Filed: May 17, 2016

(86) PCT No.: PCT/EP2016/061009
§ 371 (c)(1),
(2) Date: Nov. 17, 2017

(87) PCT Pub. No.: WO2016/188798
PCT Pub. Date: Dec. 1, 2016

(65) Prior Publication Data
US 2018/0152010 A1    May 31, 2018

(30) Foreign Application Priority Data
May 22, 2015  (DE) ........................ 10 2015 006 502

(51) Int. Cl.
*H01Q 1/00*    (2006.01)
*H02G 3/04*    (2006.01)
(Continued)

(52) U.S. Cl.
CPC ............ *H02G 3/0437* (2013.01); *G07C 1/22* (2013.01); *H02G 3/0475* (2013.01); *H02G 9/04* (2013.01); *H01Q 9/0407* (2013.01); *H04B 5/0062* (2013.01)

(58) Field of Classification Search
CPC ...... H02G 3/0437; H02G 3/0475; H02G 9/04; G07C 1/22; H04B 5/0062; H01Q 9/0407
(Continued)

(56) References Cited

U.S. PATENT DOCUMENTS 4,875,418 A * 10/1989 Moeckl ................... A47B 3/06
  108/50.02
6,521,835 B1 * 2/2003 Walsh ................. H02G 3/0437
  174/68.3
(Continued)

FOREIGN PATENT DOCUMENTS

DE       2312987 A1    9/1974
DE   102006048474 A1    4/2007
(Continued)

OTHER PUBLICATIONS

Translation of International Preliminary Report on Patentability dated Nov. 26, 2017 for International Patent Application No. PCT/EP2016/061009, 7 pages.
(Continued)

*Primary Examiner* — Jean B Jeanglaude
(74) *Attorney, Agent, or Firm* — Foley & Lardner LLP

(57) ABSTRACT

A floor cable channel is provided for positioning a cable line element on an underlying surface and for protecting the cable line element. The floor cable channel includes a first channel element and a second channel element for receiving the cable line element and a connection element connecting the first channel element to the second channel element. The connection element allows a rotational movement of the first channel element relative to the second channel element. The floor cable channel can be brought into a transport position in which the channel elements are parallel to each other and into an operating position in which the channel elements are arranged along their longitudinal axes. In the operating position, the first and second channel elements are in contact at their mutually facing front faces to provide a self-locking of the channel elements relative to each other in the operating position.

15 Claims, 6 Drawing Sheets

(51) Int. Cl.
*H02G 9/04* (2006.01)
*G07C 1/22* (2006.01)
*H01Q 9/04* (2006.01)
*H04B 5/00* (2006.01)

(58) Field of Classification Search
USPC .......................................................... 343/905
See application file for complete search history.

(56) References Cited

U.S. PATENT DOCUMENTS

| | | | | |
|---|---|---|---|---|
| 7,182,653 | B1* | 2/2007 | Hoxha | H01R 4/44 439/782 |
| 7,857,643 | B2* | 12/2010 | Dobler | H01R 27/00 439/172 |
| 8,287,469 | B2* | 10/2012 | Stefanchik | A61B 1/00073 600/146 |
| 2009/0186503 | A1* | 7/2009 | Dobler | H01R 27/00 439/172 |
| 2010/0265801 | A1 | 10/2010 | Ehelen et al. | |
| 2015/0131210 | A1* | 5/2015 | Cloran | H01H 3/38 361/622 |

FOREIGN PATENT DOCUMENTS

| | | |
|---|---|---|
| GB | 2510633 A | 8/2014 |
| WO | WO-2002071566 A2 | 9/2002 |
| WO | WO-2009011600 A1 | 1/2009 |
| WO | WO-2015004654 A1 | 1/2015 |

OTHER PUBLICATIONS

Internaitonal Search Report dated Aug. 25, 2016 for International Patent Application No. PCT/EP2016/061009, 4 pages.

* cited by examiner

FLOOR CABLE CHANNEL

CROSS-REFERENCE TO RELATED APPLICATIONS

This application is filed under 35 U.S.C. 371, which claims priority to and the benefit of PCT/EP2016/061009, having a filing date of May 17, 2016, which claims priority to and benefit of German Patent Application No. 102015006502.5, having a filing date of May 22, 2015, all of which are hereby incorporated herein by reference in their entirety for all purposes.

BACKGROUND

The present invention relates to a floor cable channel for positioning a cable line element on an underlying surface and for protecting the cable line element from the effects of external forces, comprising a first channel element and a second channel element for receiving the cable line element; and a connection element for connecting the first channel element to the second channel element at front faces of the first channel element and the second channel element.

Floor cable channels of this kind are used, for instance, as cable ramps, cable ducts, or hose ramps. The cable line element is to be protected from the effects of external forces. In this context, external forces shall in particular be understood to mean all kinds of forces exerted by people, vehicles, or parked objects that have an effect on the cable line element. For example, an electric cable is to be protected from direct exposure to people or vehicles crossing the cable.

This protection is achieved by the cable line element being placed in a channel on the floor, in which the cable line element is protected from the effects of external forces. The floor cable channel and the channel elements respectively are designed to absorb the effects of external forces and to protect the cable line element. Thus, in most cases, the floor cable channel is located on an underlying surface during use. The channel elements are arranged one after another along a longitudinal axis, which allows for a certain length to be spanned, over which the cable line element is to be protected inside the floor cable channel.

Usually, several channel elements are connected with connection elements to form a floor cable channel. Such a lining-up of several elements makes it possible to cross more or less any length of street, pedestrian path, etc. Depending on the required length of the floor cable channel essentially any number of channel elements can be combined.

Oftentimes, conventional floor cable channels are combined with a connection element to a required length, for example by locking, no sooner than at the site of operation according to their specific use. Mostly, the connection element allows for a detachable connection. The connection element may be fixed permanently to the first or the second channel element or may be designed as a separate element. Normally, the connection element allows for a flexible connection insofar as the channel elements are detachably fixed and/or are mounted rotatably against one another. After combining, the cable line element can be inserted. For this purpose, a replaceable cover, for instance, is provided that can be opened for inserting the cable line element. An embodiment with a cross-section in the form of a protrusion, into which the cable line element can be inserted, is also possible.

WO 02/071566 A2 describes a cable ramp with at least one cable duct, which can be closed by a cover and is wedge-shaped on both sides in order to facilitate crossing of the cable ramp.

DE 10 2006 048 474 A1 describes an end and/or connection piece for fastening to the end of at least one cover profile for cable lines. First connection means acting between the end and/or connection piece and the cover profile for establishing a radial form-fit connection, relating to a first axial direction, between the cover profile and the end and/or connection piece by sticking or fitting as well as by second connection means integrated in the end and/or connection piece acting between the end and/or connection piece and the cover profile and engaging in said profile for a fixation of the connection in axial direction are provided at the end and/or connection piece.

US 2010/0265801 A1 describes a time measuring system and a time measuring method. The system illuminates an elongate timing region so that RFID transponders illuminated in the region transmit identification signals that are used to generate timing information associated with competitors. A panel antenna is preferably provided on the ground to create the elongate timing region and the system preferably operates at UHF. The RFID tag preferably uses a notch antenna and may be incorporated into a credit card.

A possible application scenario for floor cable channels is the area of timing of sports events, in particular running events. Athletes carry radelements (e.g. active or passive RFID tags), which may be integrated in a starting number or attached to the laces. In the case of cycling events, it is possible to attach respective radelements to the handlebar of a bicycle. Electrical conductors in the floor cable channel contact antennae, which may also be contained inside the floor cable channel, may be positioned vertically along the track on both sides, or may be arranged in another manner. Mostly, timing is performed by a respective read-out unit, which is connected to the antenna via electrical conductors. Usually, the read-out unit is disposed at the side of the running track. It is therefore necessary for an electrical conductor to cross the track. The use of a floor cable channel protects this conductor from the impact of athletes or vehicles that cross the floor cable channel. Furthermore, it can be achieved that athletes are not obstructed by cables on the track. When the antenna is crossed or passed respectively, timing is carried out by communication with the radelement. Timing is carried out, for example, at the start and finish lines or as split timings along the track.

What is problematic in this domain is that timings at sports events are often mobile and temporary. Timing is made for a foreseeable period of time, for example one day. Even though applications are conceivable in which a permanently installed timing unit may be advantageous, the majority of sports events happen within a foreseeable time frame. Oftentimes, assembly and dismounting has to take place within a limited time slot, too. Therefore, the time measuring arrangement must be easy to assemble and dismount. Normally, a floor cable channel is transported to the site of the event to be assembled there. After the event, the floor cable channel is dismounted for transport. Oftentimes, respective time measuring systems including the corresponding floor cable channel are also shipped.

In this field of application, the use of known floor cable channels has the disadvantage that assembly and dismounting may take a long time. Moreover, the parts to be transported are often bulky and difficult to transport. Difficulties during assembly can also arise when, for instance, several cable line elements are allocated to different antennae and need to be contacted accordingly.

SUMMARY

It is therefore the object of the present invention to create a floor cable channel for positioning a cable line element on an underlying surface and for protecting the cable line element from the effects of external forces. In particular, a floor cable channel is to be created that is easier to transport and/or assemble and dismount than known floor cable channels. Moreover, it is the object of the present invention to create a floor antenna as well as a time measuring system based on this floor antenna.

According to one aspect of the invention, this object is achieved by the connection element being joint-like and allowing a rotational movement of the first channel element relative to the second channel element about a rotational axis orthogonal to a first longitudinal axis of the first channel element and orthogonal to a second longitudinal axis of the second channel element, wherein by means of said rotational movement, the floor cable channel can be brought into a transport position in which the channel elements are parallel to each other and into an operating position in which the channel elements are arranged one behind the other along their longitudinal axes, wherein in the operating position, the first channel element and the second channel element are in contact at their mutually facing front faces to provide a self-locking of the channel elements relative to each other in the operating position.

The connection element, which is designed joint-like, allows for the execution of a rotational movement of the channel elements relative to each other. For example, the connection element may be designed in the form of a joint and may be firmly connected to both channel elements. The rotational movement is then achieved directly by the joint. It is also conceivable to use a connection element that comprises an elastic material, for example an elastomer, through the flexibility of which the rotational movement can be executed. The rotational movement is then achieved by deformation of the connection element. A rotatable mounting of the connection element at least one channel element is also possible. The rotational movement then comes about by a rotation relative to the at least one supporting point. Thus, the joint-like design in particular comprises a design as a joint, a design as an elastic element, and a design as a rotatably mounted fixed element or hinge respectively. Further possibilities for achieving the same function are also conceivable. The joint-ike connection element can be in a fixed or detachable connection with one or both channel elements. The connection element can also describe a part of the channel element. The connection element may be stiff or elastic.

Usually, the cable line element is guided through the channel elements along a longitudinal axis of the channel elements. The rotational movement occurs relative to a rotational axis orthogonal to the longitudinal axis of the channel elements. The channel elements are rotated by 180° around one another. Thus, the rotation equals a flapping or folding of the channel elements. The channel elements are foldable, as it were. By the rotation, the length of the floor cable channel can be reduced for transport. In a flapped state (i.e. in the transport position of the floor cable channel), the channel elements are parallel to each other. Hence, the length of the floor cable channel is smaller than in the operating position so that transport is facilitated while assembly and dismounting are made easier as well. The channel elements may remain connected during transport.

Assembly of the floor cable channel takes place by unflapping or unfolding of the channel elements (the floor cable channel is brought into its operating position). Due to the lining-up of the channel elements the floor cable channel has a maximum length in the operating position. At the site of operation, it is sufficient to execute the flapping movement and to bring the floor cable channel into the operating position. After use dismounting can take place by simple flapping. This makes it possible to accelerate the assembly and dismounting procedures.

Compared with conventional floor cable channels, the connection element according to the invention has the advantage that the floor cable channel can be transported in a pre-assembled state. The cable line element as well as further elements may remain inside the floor cable channel during transport. At the site of operation, assembly takes place by simple unflapping. It is not necessary for channel elements to be connected and for a cable line element to be inserted. This considerably facilitates assembly and dismounting. Moreover, unprofessional or faulty assembly by untrained staff is prevented or at least hampered. Separate transportation of single small parts is avoided, which can reduce error-proneness. Furthermore, stability can be increased.

Preferably, the present invention can be used in the field of timing of sports events, as outlined above. Further fields of application can be found in the field of hose ramps. A water, air, or gas hose than corresponds to the cable line element to be protected from the effects of external forces. Hose ramps are used, for instance, by fire departments to enable vehicles and pedestrians to cross a hose that runs across a street. The hose is protected from the effects of external forces exerted by these vehicles or pedestrians.

A further aspect of the invention relates to a floor antenna for use in timing of sports events, comprising: a floor cable channel as described above; an electrical conductor received in the floor cable channel; and an antenna, in particular a patch antenna or a slot antenna, which is received in the floor cable channel and can be controlled by the electrical conductor. The antenna or the antennae in the floor cable channel may be connected to a respective controlling unit alongside the track by respective supply lines (electrical cables). Hence, the floor cable channel with inserted antenna and respective supply line equals a floor antenna. In the field of time measurement in running events it is advantageous to receive the antenna directly in the floor cable channel and to thus avoid the use of side antennae, which increase the risk of accidents and are less reliable. The floor antenna can easily and quickly be unflapped and made operational at the site of operation.

A further aspect relates to a time measuring system for timing of sports events, comprising: a floor antenna as described above; a mobile transponder for the wireless transmission of signals to the antenna; and a mobile base station, which is connected to the antenna via the electrical conductor, for controlling the antenna and for evaluating signals received from the mobile transponder for timing. The time measuring system can easily and quickly be assembled and dismounted at the place of operation. Compared with earlier systems, assembly and dismounting are less prone to errors with regard to wiring. The foldable floor antenna allows for the time measuring system to be transported or shipped in a relatively small packaging size.

In a preferred embodiment of the floor cable channel according to the invention, the connection element is formed as a one-piece element and is rotatably mounted at its contact point with the first channel element and/or at its contact point with the second channel element. The connection element may be stiff and does not need to be flexible in itself. A one-piece connection element can be produced efficiently and cost-effectively. Moreover, there are efficiency benefits during assembly. On the one hand, the connection element may be rotatably mounted on both sides; on the other hand, the connection element may be firmly connected with one channel element and be rotatably mounted only at the other channel element.

According to one embodiment, the first channel element and the second channel element have cylindrical extensions at their front faces facing the connection element, and the connection element has a first and a second recess for receiving the cylindrical extensions; and/or the connection element has cylindrical extensions, and the first channel element and the second channel element, at their front faces facing the connection element, have recesses for receiving the cylindrical extensions, wherein the cylindrical extensions and the recesses act together so that the connection element is rotatably mounted on both sides.

The recesses receive the cylindrical extensions and allow for a rotational movement around the cylindrical extensions. The cylindrical extensions may be provided at the channel elements or at the connection element. The recesses form the counterpart at the channel elements or at the connection element in each case. The recesses clasp the cylindrical extensions completely or partly and receive them. The round cross-section of the cylindrical extensions and of the recesses allows for the cylindrical extensions to be rotated in the recesses. The recesses and the cylindrical extensions form a pivot bearing. The rotational axis runs parallel to a central axis of the cylindrical extensions. A movement orthogonal to the rotational axis is prevented so that the length of the floor cable channel is defined. The cylindrical extensions may be connected with the channel element or the connection element either on one side or on both sides. This embodiment of the channel elements and the connection element allows for simple and cost-effective production and assembly. Furthermore, a robust and durable connection can be achieved. In this context, cylindrical is to be understood to mean that the extensions, at least in part, have a circular-shaped or circular-segment shaped cross-section. In particular, it means that the extensions are designed in such a manner that the recesses can be rotated around them.

In a preferred embodiment, a first pivot bearing between the connection element and the first channel element and a second pivot bearing between the connection element and the second channel element each have a degree of freedom of 180° and effect a total degree of freedom of the first channel element and the second channel element of 360°. The interaction corresponds to a pivot bearing or a swivel joint. The interaction of the cylindrical extension with the recess at the connection point of the connection element with the first channel element thus has a rotational degree of freedom of 180°. The second connection point of the connection element with the second channel element is designed accordingly. The two degrees of freedom add up to a total degree of freedom of 360° of the two channel elements relative to each other. This total degree of freedom of 360° makes the two channel elements rotatable and/or foldable on both sides. The rotational axis is parallel to the underlying surface.

The connection of the two channel elements equals a double hinge, as it were. On the one hand, a rotation can be executed during which the first channel element is rotated onto the second channel element. On the other hand, the first channel element can also be rotated under the second channel element. Depending on which rotation is executed, the top sides or the rear sides of the channel elements come into contact with each other in the parallel arrangement of the channel elements. The rotational axes of the two connection points do not coincide. It is possible to first rotate around the one and then around the other connection point or to rotate around both connection points at the same time. The rotational axis of the rotation of the two channel elements then first corresponds to the rotational axis of the rotation around the first connection point and then corresponds to the rotational axis of the rotation around the second connection point. Depending on the direction of the rotation, either the top sides or the rear sides of the channel elements face each other in the transport position. This further increases flexibility and comfort during assembly and dismounting. Flexibility is particularly increased when more than two channel elements are lined up by several connection elements. These interlinked channel elements can then be folded like an accordion. A channel element with a neighboring channel element on each side is then with its top side in contact with the top side of its first neighbor and with its rear side in contact with the rear side of its second neighbor.

According to a further preferred embodiment, the connection element is double hook-shaped for hooking into the cylindrical extensions, wherein the recesses have an essentially circular-segment shaped cross-section, and an incircle radius of each recess corresponds to a radius of each cylindrical extension at the channel elements. The double hook-shaped connection element has two recesses for receiving the cylindrical extensions. A joint-like interaction is thereby achieved. The recesses at the connection element are open at one side and can be hooked into the cylindrical extensions. The open recesses form hooks, as it were. This allows for an easy production and an easy assembly of the floor cable channel. The channel elements and the connection element may be produced separately and connected after fabrication. Moreover, the connection is detachable. Connecting and detaching of the connection can occur with the help of a suitable tool. In particular, however, connecting and detaching without a tool is made possible.

In a preferred embodiment, the connection element is detachably fixable to the cylindrical extensions by elastic deformation; and/or the distance of the centers of the incircles described by the circular-segment shaped recesses is, by means of elastic deformation, greater in a first state of the connection element than in a second state of the connection element. An at least partially elastic connection element can temporarily be deformed when it is, for example, hooked into the cylindrical extensions and can then relax again in the hooked-on position. Thus, the connection is not readily detachable but only by the application of a force. This effect can be achieved, for example, by the recesses being open at an angle area of <180°. A use in the shape of a retreat prevention, which prevents a retreat of the cylindrical extensions after fixation, is also possible. An elastic connection element may, for example in interaction with partly planar-shaped front faces, allow for an increase in stiffness of the floor cable channel in its operating position and an improved mechanical stability.

According to an embodiment, the first channel element and the second channel element, at their front faces facing the connection element in a cross-section orthogonal to the rotational axis, are formed with rounded off edges. By the rounded embodiment it is achieved that the rotation of the channel elements relative to each other is not blocked even if the channel elements touch each other. Jamming is prevented. During rotation, the rounded channel elements touch each other at alternating points of their rounded off edges. The distance of the bearing, i.e. of the rotational axes defined by the cylindrical extensions, remains constant. This increases stability during rotation. Robustness and stability of the floor cable channel is increased.

According to an embodiment, the first channel element and the second channel element, at their front faces facing the connection element, have openings orthogonal to the rotational axis to receive the cable line element when the floor cable channel is in its transport position. In the transport position of the floor cable channel the cable line element runs from one channel element to the next. Thus, the cable line element is also kinked by 180°. Depending on the cable line element, a minimum radius for the kinking is required to avoid damage of the cable line element. This minimum kinking radius can for example be achieved by an excess in length of the cable line element in the area of kinking. However, the excess in length may result in the cable line element protruding in the transport position of the floor cable channel and thus being exposed to effects from transport. The openings allow for the cable line element to run through them in the transport position of the floor cable channel. This increases the radius for kinking without an excess in length. This results in an exposure of the cable line element in the transport position being avoided.

In a preferred embodiment, the first channel element and the second channel element, at their front faces facing the connection element in the area of the cable line element, taper in the direction of the connection element in order to increase a kinking radius of the cable line element in the transport position of the floor cable channel. The minimum kinking radius depends on the design of the channel elements in their area for reception of the cable line element. In particular, the area of the front face facing the connection element is relevant. The wedge-shaped tapering further increases the kinking radius and the minimum kinking radius respectively. The cable line element may run at a greater distance to the rotational axis along the wedge-shaped construction.

According to an embodiment, the first channel element and/or the second channel element, at their front faces facing the connection element, comprise an elastically deformable material, in particular an elastomer, and/or are partly planar-shaped parallel to the rotational axis and orthogonal to their longitudinal axes to provide a self-locking in the operating position of the floor cable channel. By a deformable material at the front face it is achieved that a latching position can be predefined. If at least on one side a plane at a channel element is in contact with the other channel element and the distance between the channel elements is defined by the connection element, the rotational movement according to the invention of the one channel element against the other channel element can only be executed if the channel element with the plane at its front face is deformed in the area of said plane. It can thus be achieved that a position of the channel elements toward one another, i.e. a particular rotation angle, can be fixated. The use of the elastic material makes it necessary that the elastic material (or the connection element) is deformed or indented, respectively, to leave this predefined relative position. Advantageously, the operating position equals the predefined position in which the channel elements are at an angle of 0° to each other, i.e. are arranged one after another along their longitudinal axes. This increases stability of the floor cable channel in the operating position and further facilitates assembly and dismounting.

In a further embodiment, the channel elements are constructed symmetrically in relation to a plane orthogonal to their longitudinal axes, and the channel elements, at both front faces, can be connected to further channel elements by further connection elements. Advantageously, the invention enables a combination of a plurality of channel elements. The channel elements are connected to each other by connection elements. The channel elements can be folded on top of each other so that a kind of stack results in the transport position. Assembly into the operating position is carried out by unfolding in the manner of an accordion or a pair of bellows respectively. In the transport position, each channel element is in contact with its top side with a first neighboring channel element and with its rear side with a further channel element. By using several channel elements essentially any length of floor cable channel can be realized depending on the application scenario. At both front faces, the channel elements have, relative to their longitudinal axes, corresponding connection points for connection elements and/or for further channel elements. For example, cylindrical extensions, which can be connected by a double hook-shaped connection element, may be provided at both sides. The symmetrical design allows for cost-effective production, for example by injection molding.

In a further preferred embodiment, the floor cable channel additionally comprises a third channel element and a fourth channel element connected by a second connection element, wherein the third channel element or the fourth channel element are connected to the first or the second channel element by a third connection element. Thus, this embodiment refers to a floor cable channel according to the invention with four channel elements connected by connection elements. The four channel elements may, for instance, have a length of approximately 58 cm or one meter each so that a total length of the floor cable channel of approximately 5 meters or 9 meters, respectively, results.

In an embodiment, the first channel element and the second channel element are designed to receive an electrical conductor along their longitudinal axes and/or to receive an antenna, in particular a patch antenna or a slot antenna, which can be controlled by the electrical conductor. The floor cable channel has corresponding insertion facilities for cable lines and antennae. Oftentimes, the use of one separate antenna per channel element is particularly favorable.

In an embodiment, the channel elements are wedge-shaped on both sides in a cross-section orthogonal to their longitudinal axes in order to enable people and/or vehicles to cross the cable line element in the operating position of the floor cable channel. The wedge form ensures a flat bearing on the underlying surface. The risk of accidents and/or compromised comfort when crossing the floor cable channel with a vehicle or on foot is reduced.

In an embodiment, the first channel element and the second channel element each comprise a floor element with a recess, and a cover element with a clamping extension, wherein the floor element can be detachably locked with the cover element by an engagement of the clamping extension into the recess. This locking mechanism provides a simple way to gain access to the cable line element and/or to an antenna in the floor cable channel.

It is understood that the features mentioned hereinbefore and those to be commented on hereinafter may be used not only in the specified combination but also in other combinations or in isolation without departing from the scope of the present invention.

BRIEF DESCRIPTION OF THE DRAWINGS

The invention is described and explained in more detail by means of a number of selected embodiments in connection with the enclosed figures hereinafter. In the figures.

DETAILED DESCRIPTION

Figure 1:
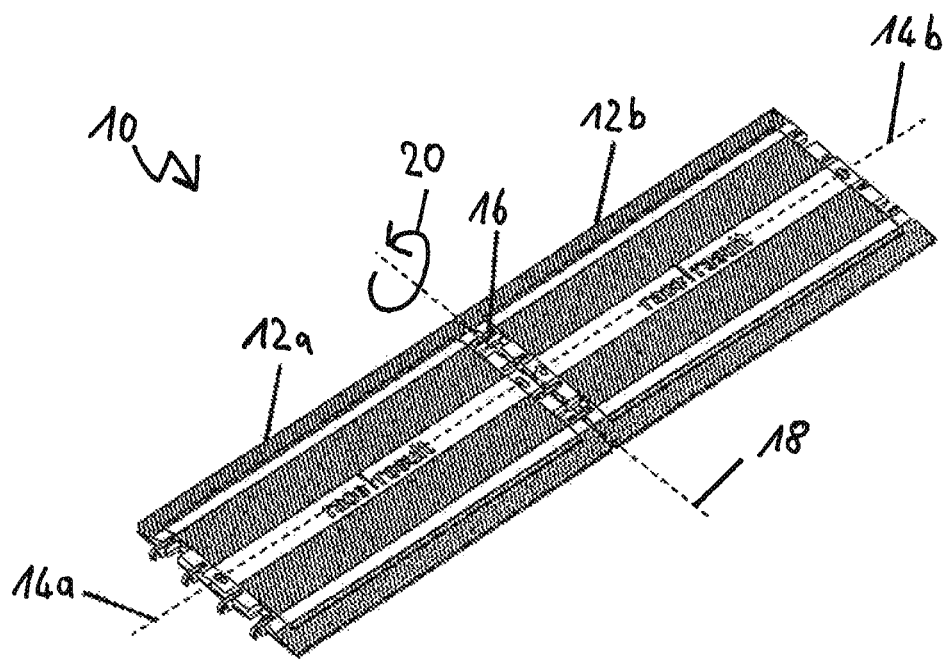
FIG. 1 shows a perspective view of a floor cable channel according to the invention in the operating position.

FIG. 1 shows an exemplary embodiment of a floor cable channel 10 according to the invention. A floor cable channel 10 for use in timing of a sports event is shown. This kind of floor cable channel may for example be used at the start and finish lines or in the field of split timing during a sports event, wherein an electrical conductor for contacting antennae as well as an antenna is protected by the floor cable channel. Advantageously, the floor cable channel 10 is riffled on its top side to prevent people crossing the floor cable channel 10 from slipping. It is understood that the principle of the present invention may also be used in other areas of application, such as in the field of hose ramps.

A cable line element (in the field of timing usually an electrical conductor for contacting an antenna), which is to be mechanically protected from the effects of external forces by the floor cable channel 10, runs through the floor cable channel 10 (not visible in the perspective view shown). In particular, the floor cable channel 10 absorbs forces exerted by athletes and vehicles. The floor cable channel 10 comprises a first channel element 12a and a second channel element 12b. The cable line element runs on the inside of these channel elements 12a, 12b essentially along the longitudinal axes 14a, 14b of the channel elements 12a, 12b. Mostly, the cable line element enters the channel element at the one front face of a channel element and exits it at the other front face. If the channel element is connected to a further channel element at its front face, the cable line element may be directly led from the one channel element into the other channel element.

The floor cable channel 10 shown in FIG. 1 is in its operating position in which it can be placed flatly on the underlying surface. In the operating position, the channel elements are arranged one after another along their longitudinal axes 14a, 14b or along a mutual longitudinal axis respectively. By the back-to-back arrangement a length is achieved that allows for the cable line element to be led across a street or a field path.

At their front faces, the channel elements 12a, 12b are connected via a connection element 16. In the exemplary embodiment shown, the channel elements are connected by several further connection elements, which further increases stability. The function is not affected by the presence of a plurality of connection elements in the present exemplary embodiment. In the following, the singular form of connection element is used, wherein it is understood that several connection elements may also be used.

The connection element 16 is formed joint-like. The connection element 16 allows for the channel elements 12a, 12b to be rotated relative to each other. An exemplary course of a rotational axis 18 is shown, around which the channel elements 12a, 12b may be rotated relative to each other. The depicted arrow 20 visualizes the possible rotational movement.

Figure 2:
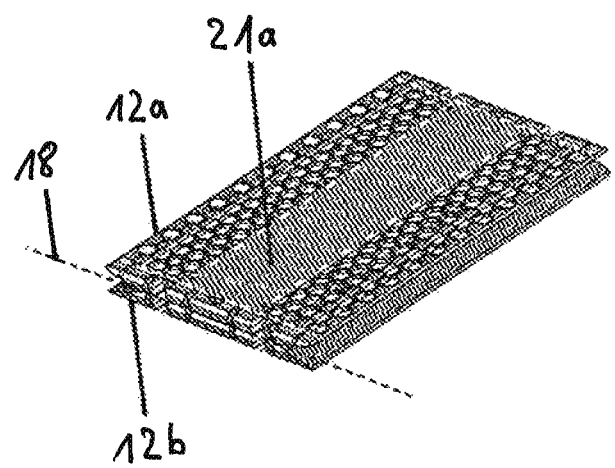
FIG. 2 shows a perspective view of a floor cable channel according to the invention in the transport position.

By a rotational movement of the channel elements 12a, 12b relative to each other and relative to the rotational axis 18, the floor cable channel can be brought from the operating position, as shown in FIG. 1, into the transport position, as shown in FIG. 2. Advantageously, the rotational axis 18 runs orthogonal to the longitudinal axes 14a, 14b of the channel elements 12a, 12b. In the exemplary embodiment shown, the rotational axis 18 also runs parallel to the underlying surface and/or parallel to a transverse direction of the channel elements 12a, 12b. During rotation of the channel elements 12a, 12b, the rotational axis 18 may shift parallel to itself and does not need to be clearly defined.

FIG. 2 shows the floor cable channel 10 in its transport position. The first channel element 12a is rotated around the rotational axis 18 and is situated on the second channel element 12b. In other words, the first channel element 12a is flapped or folded onto the second channel element 12b. Thus, the rear side 21a of the first channel element 12a is visible in FIG. 2. The channel elements 12a, 12b are arranged parallel to one another, in particular, their longitudinal axes are oriented parallel to one another. The top sides of the channel elements 12a, 12b are in contact with each other. Aside from the rotation of the first channel element 12a onto the second channel element 12b, as shown in FIG. 2, it may also be possible to rotate (flap) the first channel element 12a under the second channel element 12b so that the rear sides of the channel elements 12a, 12b are in contact with each other.

Also in the transport position of the floor cable channel 10 the channel elements 12a, 12b are connected by the connection element 16. In the transport position of the floor cable channel 10, the cable line element is usually received in the channel elements 12a, 12b. Accordingly, the cable line element is kinked or bent in the area of the connection element 16.

In comparison with earlier floor cable channels, which did not have a joint-like connection element according to the invention, the present invention allows for the floor cable channel to be brought into the transport position and/or to be assembled and dismounted without further installation steps such as putting together the channel elements or inserting the cable line element thereafter. Assembly and dismounting are thus made more efficient. Moreover, shorter channel elements may also be used without further effort so that the floor cable channel is less bulky in its transport position and is thus easier to transport.

Figure 3:
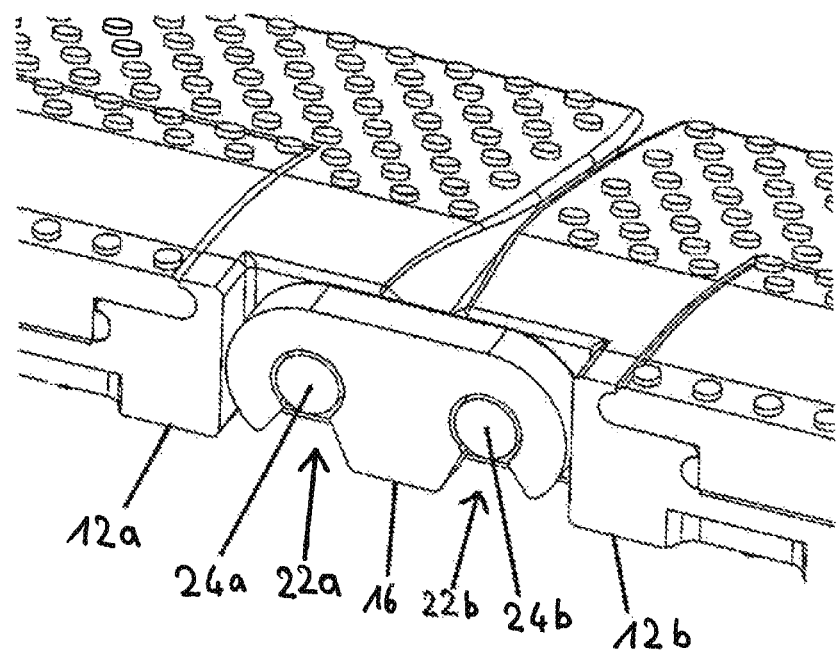
FIG. 3 shows a sectional view of a connection of two channel elements with a connection element in the operating position of the floor cable channel.

FIG. 3 shows a detail of a sectional view of the floor cable channel in the area of the connection element 16. The floor cable channel shown is in its operating position. The connection element 16, which is formed joint-like, connects the two channel elements 12a, 12b. The connection element 16 is formed as a one-piece element and has recesses 22a, 22b on both sides, which clasp cylindrical extensions 24a, 24b at the channel elements 12a, 12b. The cylindrical extensions 22a, 22b are preferably fixed on both sides of the respective channel element 12a, 12b, but may also be fixed only on one side. The cylindrical extensions 24a, 24b define supporting points around which the connection element 16 can be rotated. The connection element 16 shown is rotatably mounted on both sides. A rotation of the connection element 16 allows for a rotation of the channel elements 12a, 12b relative to each other. The rotation can be carried out in both directions. The connection element 16 forms a kind of double hinge, as it were.

Figure 4:
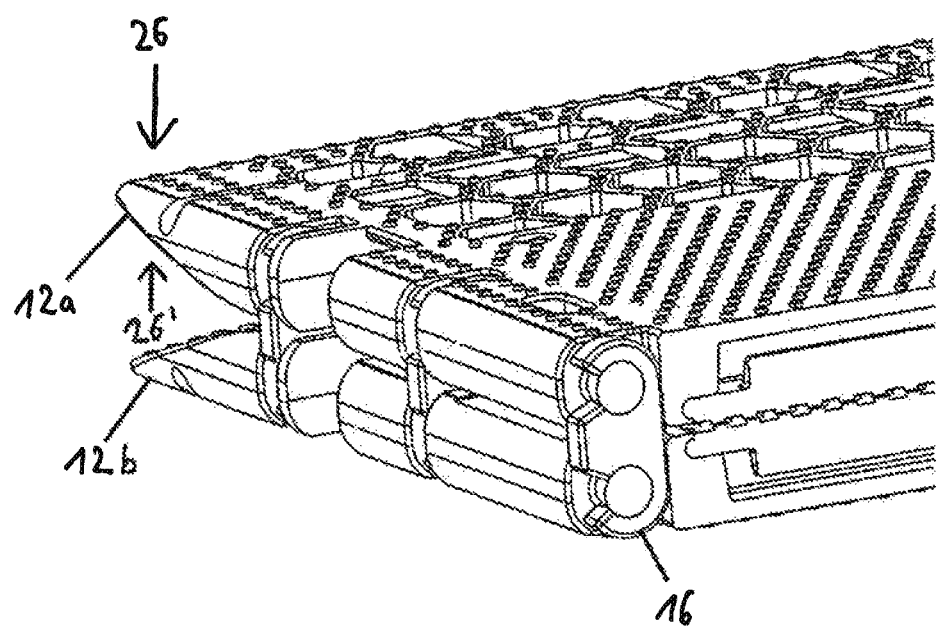
FIG. 4 shows a sectional view of a connection of two channel elements with a connection element in the transport position of the floor cable channel.

FIG. 4 shows a sectional view through the floor cable channel in the transport position. In comparison to FIG. 3, the connection element is rotated against both channel elements 12a, 12b so that the channel elements 12a, 12b are arranged parallel to each other. Hence, the rotational axis of the rotation of the channel elements 12a, 12b relative to each other may be defined by the two supporting points. Part of the rotation occurs around the first supporting point, another part of the rotation occurs around the second supporting point.

Preferably, the connection element 16 has a rotational degree of freedom of 180° against each of the two channel elements. Thus, the connection element 16 may, starting at its 0° position in the operating position of the floor cable channel, be rotated by 90° in each direction. In interaction with a corresponding mounting at the other channel element, which also has a rotational degree of freedom of 180°, this results in a total degree of freedom of 360° of the channel elements 12a, 12b relative to each other. Consequently, the connected channel elements 12a, 12b may be completely rotated around one another so that a flapping on both sides is made possible. On the one hand, the channel elements 12a, 12b may thus be brought into contact with each other at their rear sides 26, and on the other hand with their top sides 26'.

Figure 5:
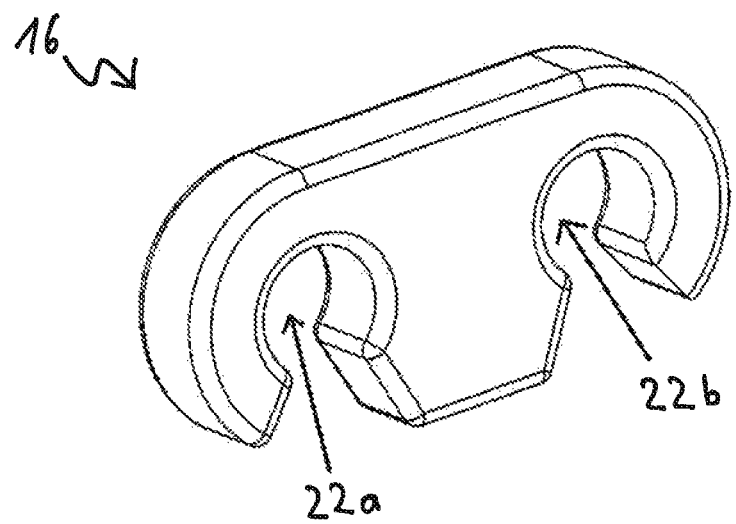
FIG. 5 shows a view of a double hook-shaped connection element.

FIG. 5 shows a detailed view of the connection element 16. The connection element has recesses 22a, 22b on both sides and is insofar double hook-shaped as the recesses 22a, 22b are open on one side. The recesses 22a, 22b have a circular-segment shaped cross-section. The diameter of the incircle defined by the recesses 22a, 22b essentially corresponds to the outside diameter of the cylindrical extensions. The shown double-hook shape allows for a simply connection with the channel elements. In particular, the channel elements may be detachably connected and/or firmly fixed to the connection element by hooking. For this purpose, the recesses act together with the cylindrical extensions at the channel elements.

Advantageously, the connection element 16 consists of an elastically deformable material so that the recesses 22a, 22b, which are open on one side, can act as springs. The connection element 16 is deformed elastically during reception of the cylindrical extensions and relaxes again once the cylindrical extensions are fully clasped. For this purpose, the openings of the recesses 22a, 22b are funnel-shaped so that the recesses 22a, 22b can bend open when they are pushed onto the cylindrical extensions. In addition, it is possible that the connection element 16 connects the channel elements under pressure, i.e. that a distance of the centers of the recesses is greater in a relaxed state than in a state in which the connection element connects two channel elements.

In other embodiments of the invention the connection element may also be rotatably mounted only on one side. Hence, a supporting point may be defined only on the side of the one channel element, and the connection element may be firmly fixed to the other channel element. It is also possible that the recesses in the connection element are not open on one side but are closed. Assembly can then occur, for example, by connecting several parts.

Moreover, a reversal of the shown principle of rotatable mounting is also possible insofar as the cylindrical extensions can also be provided at the connection element and can engage with recesses in the channel elements. In this case the connection element could, for example, be designed joint-like to that effect that it has a bone-like design, wherein two cylindrical segments are connected by a connection segment. The cylindrical segments form the cylindrical extensions and can engage in corresponding recesses in the channel elements.

In further embodiments of the invention it is also possible that the connection element is designed joint-like to that effect that it is firmly connected to one or both of the channel elements and has an elasticity of its own. Rotation of the channel elements relative to each other then occurs by elastic deformation of the connection element. Alternatively, the connection element may also be firmly connected to one or both channel elements and may be formed as a joint. Further joint-like designs for achieving the same function are conceivable.

Figure 6:
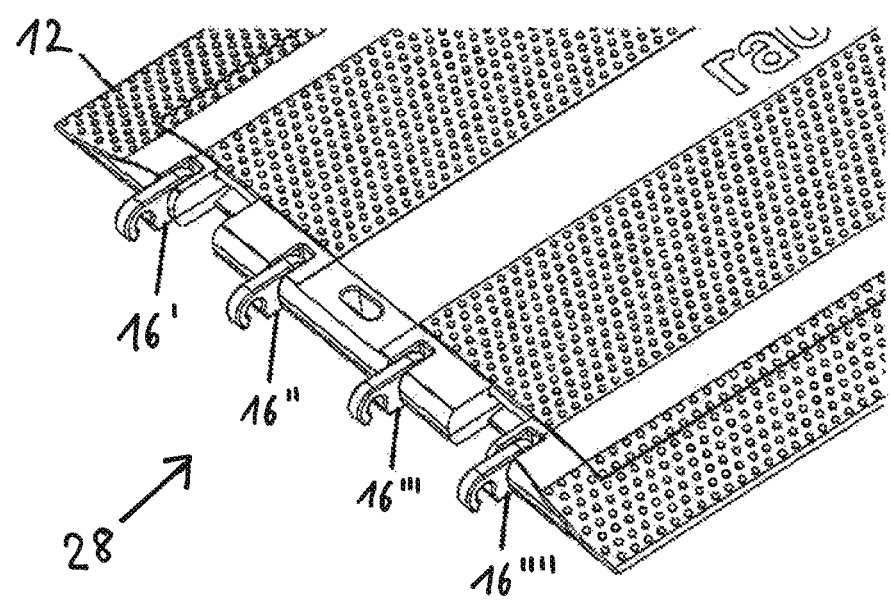
FIG. 6 shows a view of a channel element with four hooked-on connection elements.

FIG. 6 shows the front face 28 of a channel element 12. In the exemplary embodiment shown, four connection elements 16', 16'', 16''', 16'''' are provided for connecting the channel element 12 with an adjacent channel element. The function of a single connection element is not affected by the use of several connection elements. Stability may be increased. Preferably, the several connection elements 16', 16'', 16''', 16'''' are designed identically, while it is also possible to use differently designed connection elements. It goes without saying that more or fewer than four identically or differently designed connection elements may also be used. As in particular shown in FIG. 6, the front face 28 of a first channel element may describe the entire area facing the second channel element (in the operating position of the floor cable channel) and/or the area of the channel element allocated to the connection element. The front face may also describe the front plane of the first channel element facing the second channel element in the operating position.

Figure 7:
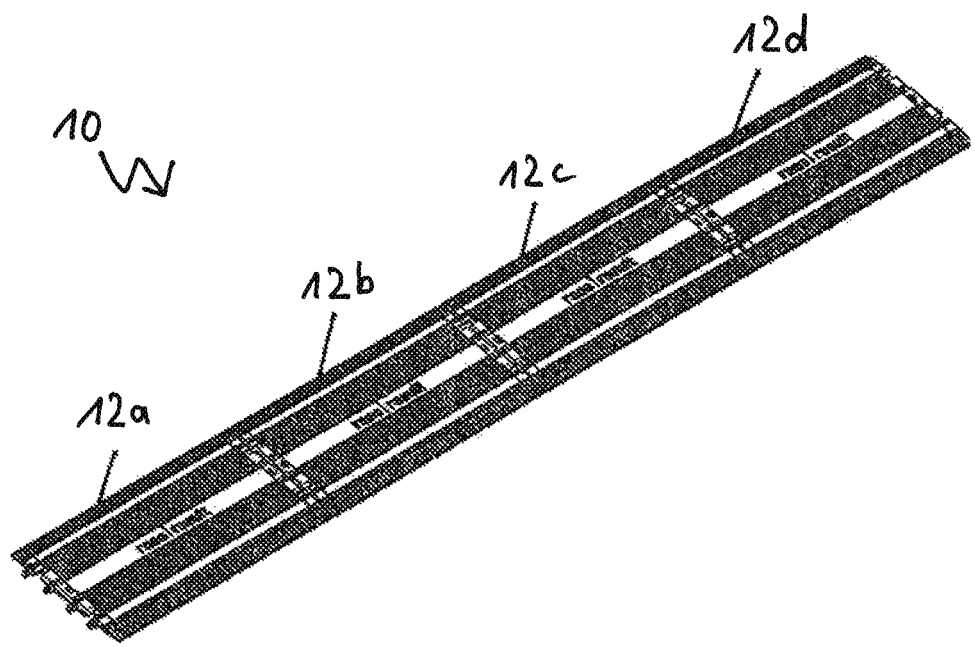
FIG. 7 shows a view of a floor cable channel with four channel elements in the operating position.

FIG. 7 shows a floor cable channel 10 with a total of four channel elements 12a, 12b, 12c, 12d. The floor cable channel 10 is in its operating position for being placed on the underlying surface. Each channel element is connected at its front face with adjacent channel elements via a connection element. In the embodiment shown, the channel elements are designed inversely relative to a transverse axis orthogonal to their longitudinal axis so that essentially any number of channel elements can be connected. This makes it possible to provide floor cable channels with any desired length on the basis of the same basic components. It is thus possible to make the track of a running event as wide as desired in the areas of start and finish or in the area of split timing. This is particularly favorable at mass sports events.

Figure 8:
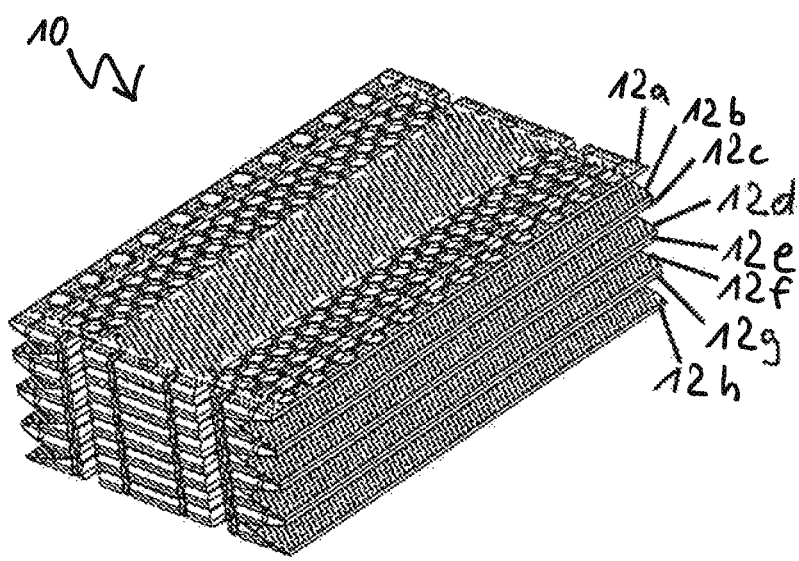
FIG. 8 shows a view of a floor cable channel with a plurality of channel elements in the transport position.

FIG. 8 shows a floor cable channel 10 with a total of eight channel elements 12a-12h in the transport position. The degree of freedom of 360° between two adjacent channel elements allows for a folding in the manner of an accordion. For example, the channel element 12d is in contact with its top side with the top side of the adjacent channel element 12c and with its rear side in contact with the rear side of the adjacent channel element 12e.

Figure 9:
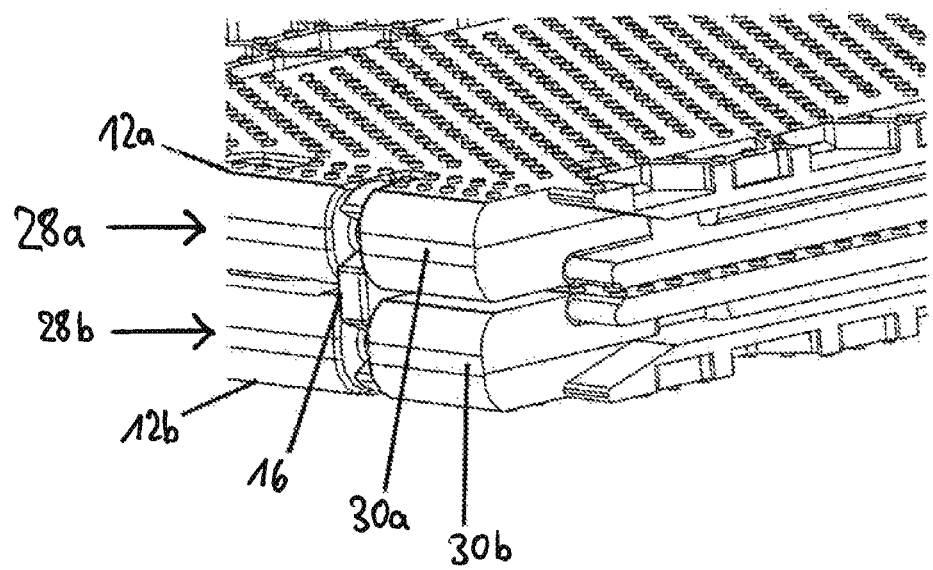
FIG. 9 shows a sectional view of an opening at the front face of a channel element and a wedge-shaped tapering in the area of the cable line element.

FIG. 9 shows a detailed view of two channel elements 12a, 12b in the area of their front faces, where they are connected with a connection element 16. The channel elements 12a, 12b are formed with rounded off edges in the area of their front faces 28a, 28b. The rounded design enables rotation of the channel elements 12a, 12b around each other at a constant distance. The distance between the channel elements 12a, 12b is kept constant by the connection element 16. Because of the rounded design the distance remains constant also during rotation, which enables a defined and stable course of rotation. Thus, the roundness corresponds to an at least partial rounding or chamfering of the channel elements at their front faces.

Preferably, the channel elements 12a, 12b are also partly planar-shaped in the area of their front faces. Thus, the channel elements 12a, 12b have planes 30a, 30b in the direction of their front faces 28a, 28b. In the operating position of the floor cable channel the planes 30a, 30b are parallel and in contact with each other. Because the distance between the channel elements 12a, 12b is defined by the connection element 16, rotation of the channel elements 12a, 12b around each other is only possible by elastic deformation. On the one hand, the connection element 16 can be designed elastically deformable and can be deformed during rotation out of the contacting of the planes 30a, 30b. Hence, the distance between the recesses in the connection element may be greater or smaller. On the other hand, the channel elements 12a, 12b may also be elastically deformable in the area of their front faces and may be deformed during rotation. This results in a fixation and/or self-locking of the channel elements 12a, 12b relative to each other in the operating position of the floor cable channel. Stability and stiffness of the floor cable channel in the operating position may be increased. Because the front faces of the channel elements are in contact in the operating position of the floor cable channel, a self-locking of the floor cable channel and/or the channel elements in the operating position of the floor cable channel is achieved. In particular, a tractive force that achieves self-locking can be effected by an elastic material at the front faces or by an elastic connection element between the two channel elements. Additionally or alternatively, self-locking can also be achieved by a partly planar-shaped design of the channel elements at their front faces. As particularly shown in FIG. 9, a partly planar design of at least one front face 28a, 28b describes a partial design of the front face as a flat plane 30a, 30b running orthogonal to the longitudinal axis of the channel elements. The self-locking prevents movement between the channel elements. In particular, the flap movement into the transport position is blocked. At the same time, a rotation and/or a tolerance relative to an axis at a right angle to the under-lying surface is blocked. The self-locking has an effect on all kinds of rotational movements of the channel elements relative to each other.

Figure 10:
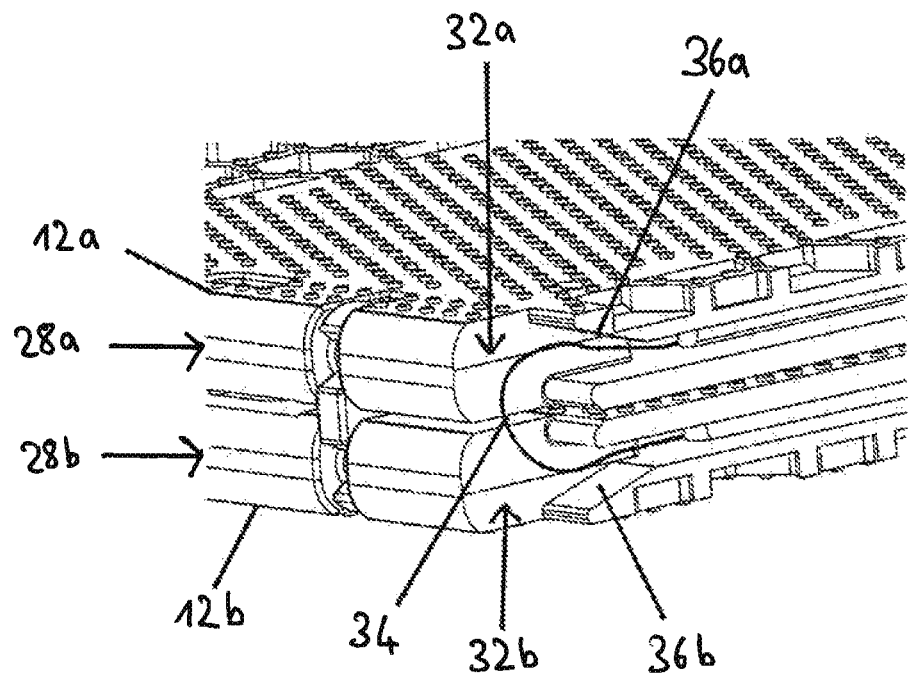
FIG. 10 shows a view of an exemplary course of a cable line element in the transport position of the floor cable channel.

FIG. 10 shows another detailed view of two channel elements 12a, 12b in the area of their front faces. The channel elements 12a, 12b have openings 32a, 32b in the area of their front faces. The cable line element 34 is received in the channel elements and runs through both channel elements 12a, 12b. Due to the thickness of the channel elements 12a, 12b needed for sufficient stability, an excess length of the cable line element 34 would be required during rotation of the channel elements 12a, 12b relative to each other. The cable line element 34 would only then not block a rotation of the channel elements 12a, 12b relative to each other if the cable line element 34 was long enough to be able to overcome the excess stretch from the exit at the front face of the first channel element 12a to the entrance at the front face of the second channel element 12b brought about by the thickness of the channel elements. In other words, the front faces 28a, 28b of the channel elements 12a, 12b are in direct contact in the operating position of the channel element but not in the transport position. So if the cable line element were to exit and enter through openings at the front faces of the channel elements 12a, 12b, the required length for this would be greater in the transport position than in the operating position. Moreover, the cable line element would protrude over the front faces in the transport position and would thus be exposed to external effects during transport.

This is prevented by the openings 32a, 32b provided in the channel elements 12a, 12b in the area of their front faces. The openings 32a, 32b receive the cable line element 34 in the transport position of the floor cable channel. Thus, no excess length of the cable line element is necessary to execute the rotation of the channel elements relative to each other. The openings 32a, 32b allow for a rotation of the channel elements 12a, 12b relative to each other with the received cable line element 34 without the need for an excess length of the cable line element.

Moreover, the cable line element 34 is kinked when the channel elements 12a, 12b are rotated relative to each other. The openings 32a, 32b also effect that the kinking radius may be larger, which reduces the mechanical strain on the cable line element 34. The kinking plane of the cable line element is shifted inwards, as it were.

Further advantageous is a wedge-shaped design 36a, 36b of the channel elements 12a, 12b in the area of the course of the cable line element 34. The channel elements 12a, 12b taper in the direction of their front faces 28a, 28b and/or in the direction of the respective other channel element in this area to further increase the kinking radius of the cable line element 34 when the floor cable channel is in its transport position. This further reduces the mechanical strain on the cable line element. There may be a wedge-shaped design on one side, i.e. only in the direction of the top side or the rear side of the channel element, as well as on both sides.

Figure 11:
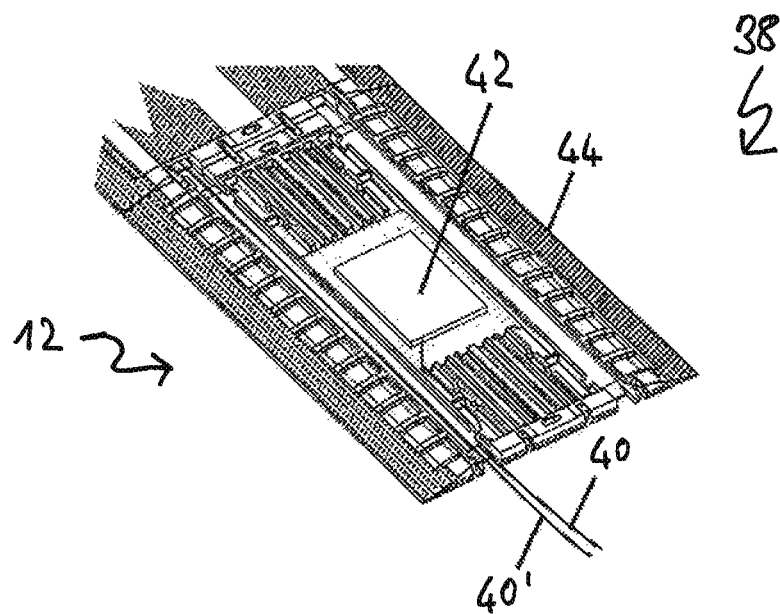
FIG. 11 shows a view of a floor antenna according to the invention with a floor cable channel, an antenna and a cable line element.

FIG. 11 shows a section of a floor antenna 38 according to the invention. The floor antenna 38 comprises a channel element 12, an electrical conductor 40, and an antenna 42, a patch antenna in the example shown. The antenna 42 can be controlled by the electrical conductor 40. The electrical conductor 40 corresponds to the cable line element. Usually, a channel element comprises a removable cover element that can be hooked on a floor element 44. For clarification, the floor element 44 of the channel element 12 is depicted without a cover element in FIG. 11.

Hence, the channel element 12 on the one hand protects the cable line element 40 and on the other hand also protects the antenna 42 from the effects of external forces. A further channel element or a further floor antenna, respectively, can be connected via a connection element. In this case it is possible for a further antenna in the further channel element to be controlled by a cable line element 40' that runs across both channel elements. The course of the cable line elements 40, 40' each is shown by way of example in the figures. A different course is also possible.

Figure 12:
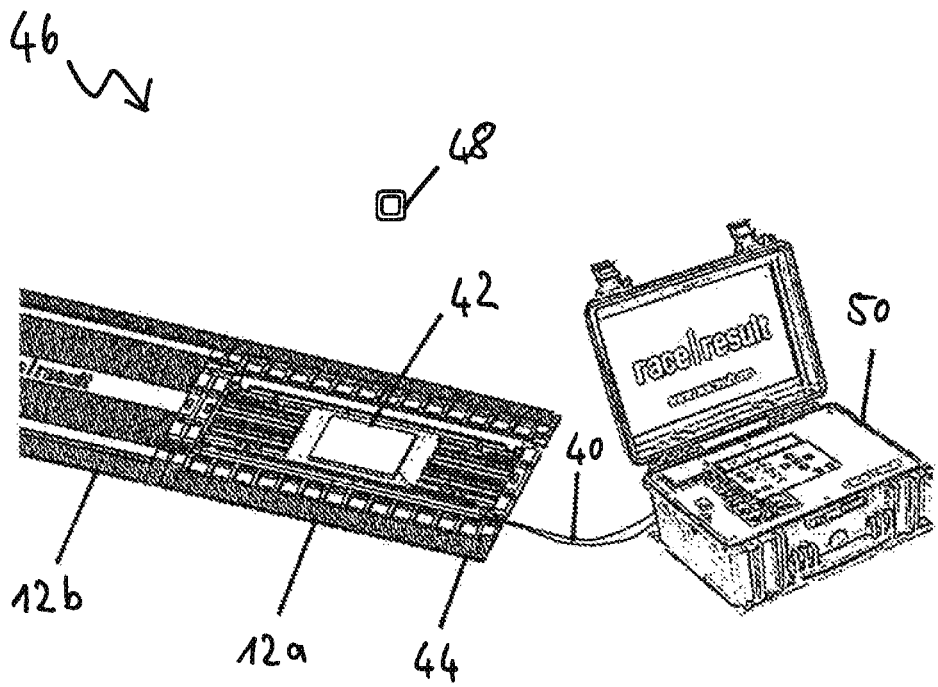
FIG. 12 shows a view of a time measuring system according to the invention.

FIG. 12 shows a time measuring system 46 according to an aspect of the present invention. The time measuring system 46 comprises a floor antenna 38 with a floor cable channel 12a, 12b, an electrical conductor 40 and an antenna 42, a mobile transponder 48 for wireless communication with the antenna 42, and a base station 50, which is connected to the antenna 42 via the electrical conductor 40.

The time measuring system 46 is designed for a preferably mobile use in timing of sports events such as marathon events, cycle racing, ski racing, or car racing. The time measuring system 46 is assembled at the place of operation and is dismounted again after use. The flappable channel elements of the floor antenna according to the invention allow for uncomplicated and quick assembly and dismounting as well as for efficient and room-saving transport. The channel elements protect electrical conductors and antennae from the effects of forces exerted by athletes crossing the time measuring site.

Signals from the transponder 48 received from the antenna 42 are analyzed in the (mobile) base station 50. The transponder 48 is carried by an athlete. The transponder 48 may, for example, be an active or a passive transponder. In particular, it may be a UHF RFID transponder. The base station 50 may, for instance, communicate with a central server so that the results of timing can be provided in a network. The base station can also be directly connected to a display unit for displaying the measured times.

The invention claimed is:

1. A floor cable channel for positioning a cable line element on an underlying surface and for protecting the cable line element from the effects of external forces, comprising:
   a first channel element and a second channel element for receiving the cable line element; and
   a connection element for connecting the first channel element to the second channel element at front faces of the first channel element and the second channel element,
   wherein the connection element is joint-like and allows a rotational movement of the first channel element relative to the second channel element about a rotational axis orthogonal to a first longitudinal axis of the first channel element and orthogonal to a second longitudinal axis of the second channel element, wherein by means of said rotational movement, the floor cable channel is brought into a transport position in which the channel elements are parallel to each other and into an operating position in which the channel elements are arranged one behind the other along their longitudinal axes,
   wherein, in the operating position, the first channel element and the second channel element are in contact at their mutually facing front faces to provide a self-locking of the channel elements relative to each other in the operating position.

2. The floor cable channel according to claim 1, wherein the connection element is formed as a one-piece element and is rotatably mounted at its contact point with the first channel element and/or at its contact point with the second channel element.

3. The floor cable channel according to claim 1, wherein the first channel element and the second channel element have cylindrical extensions in the area of their front faces allocated to the connection element, and in that the connection element has a first and a second recess for receiving the cylindrical extensions; and/or the connection element has cylindrical extensions and the first channel element and the second channel element, in the area of their front faces allocated to the connection element have recesses for receiving the cylindrical extensions, wherein
the cylindrical extensions and the recesses act together like joints so that the connection element is rotatably mounted on both sides.

4. The floor cable channel according to claim 3, wherein a first pivot bearing between the connection element and the first channel element and a second pivot bearing between the connection element and the second channel element each have a degree of freedom of 180° and effect a total degree of freedom of the first channel element and the second channel element of 360°.

5. The floor cable channel according to claim 3, wherein the connection element is double hook-shaped for hooking into the cylindrical extensions, wherein the recesses have an essentially circular-segment shaped cross-section, and an incircle radius of the recesses each corresponds to a radius of the cylindrical extensions at the channel elements.

6. The floor cable channel according to claim 5, wherein
   the connection element is detachably fixable to the cylindrical extensions by elastic deformation; and/or
   the distance of the centers of the incircles described by the circular-segment shaped recesses is, by means of elastic deformation, greater in a first state of the connection element than in a second state of the connection element.

7. The floor cable channel according to claim 1, wherein the first channel element and the second channel element, at their front faces allocated to the connection element, are formed with rounded off edges in a cross-section orthogonal to the rotational axis.

8. The floor cable channel according to claim 1, wherein the first channel element and the second channel element at their front faces allocated to the connection element, have openings that are formed orthogonal to the rotational axis to receive the cable line element when the floor cable channel is in its transport position.

9. The floor cable channel according to claim 8, wherein the first channel element and the second channel element in the area of their front faces allocated to the connection element, in the area of the cable line element taper in the direction of the connection element in order to increase a kinking radius of the cable line element in the transport position of the floor cable channel.

10. The floor cable channel according to claim 1, wherein the first channel element and/or the second channel element at their front faces allocated to the connection element, comprise an elastically deformable material, in particular an elastomer, and/or are partly planar-shaped parallel to the rotational axis and orthogonal to their longitudinal axes to provide a self-locking in the operating position of the floor cable channel.

11. The floor cable channel according to claim 1, wherein the channel elements are constructed symmetrically in relation to a plane orthogonal to their longitudinal axes and in that the channel elements, at their front faces, can be connected to further channel elements by further connection elements.

12. The floor cable channel according to claim 1, additionally comprising a third channel element and a fourth channel element connected by a second connection element, wherein the third channel element or the fourth channel element is connected to the first or the second channel element by a third connection element.

13. The floor cable channel according to claim 1, wherein the first channel element and the second channel element are designed to receive an electrical conductor along their longitudinal axes and/or to receive an antenna, in particular a patch antenna or a slot antenna, which can be controlled by the electrical conductor.

14. A floor antenna for use in timing of sports events, comprising:
   a floor cable channel according to claim 1;
   an electrical conductor received in the floor cable channel; and
   an antenna, in particular a patch antenna or a slot antenna, which is received in the floor cable channel and can be controlled by the electrical conductor.

15. A time measuring system for timing of sports events, comprising:
   a floor antenna according to claim 14;
   a mobile transponder for the wireless transmission of signals to the antenna; and
   a mobile base station, which is connected to the antenna via the electrical conductor, for controlling the antenna and for evaluating signals received from the mobile transponder for timing.

* * * * *